United States Patent [19]

Hayashi et al.

[11] Patent Number: 5,434,574
[45] Date of Patent: Jul. 18, 1995

[54] SYSTEM FOR DETECTING AN ALTITUDE OF A VEHICLE DEPENDENT ON A GLOBAL POSITIONING SYSTEM

[75] Inventors: Katsuyoshi Hayashi; Isao Endo, both of Saitama, Japan

[73] Assignee: Pioneer Electronic Corporation, Tokyo, Japan

[21] Appl. No.: 176,651

[22] Filed: Jan. 3, 1994

[30] Foreign Application Priority Data

Jan. 13, 1993 [JP] Japan .................................. 5-004070
Jan. 13, 1993 [JP] Japan .................................. 5-004071

[51] Int. Cl.$^6$ ............................ G01S 5/14; H04B 2/85
[52] U.S. Cl. ................................ 342/357; 342/462; 342/123
[58] Field of Search ................ 342/357, 462, 123; 455/12.1

[56] References Cited

U.S. PATENT DOCUMENTS

| | | | |
|---|---|---|---|
| 5,030,957 | 7/1991 | Evans | 342/357 |
| 5,072,227 | 12/1991 | Hatch | 342/357 |
| 5,170,171 | 12/1992 | Brown | 342/25 |
| 5,185,610 | 2/1993 | Ward et al. | 342/357 |
| 5,265,025 | 11/1993 | Hirata | 364/449 |

FOREIGN PATENT DOCUMENTS 4123097 1/1992 Germany.
2256987 12/1992 United Kingdom.

*Primary Examiner*—Thomas H. Tarcza
*Assistant Examiner*—Dao L. Phan
*Attorney, Agent, or Firm*—Nikaido, Marmelstein, Murray & Oram

[57] ABSTRACT

It is determined that an altitude of a vehicle can not be calculated from data applied from satellites. When the calculation can not be performed, a provisional altitude is obtained with a following equation:

$$H = (1-\alpha)H_G + \alpha H_O$$

where $H_G$ is an altitude obtained by the GPS, $H_O$ is a reference altitude obtained by the outside means, $\alpha$ ($0 < \alpha < 1$) is a predetermined smoothing coefficient.

4 Claims, 12 Drawing Sheets

SYSTEM FOR DETECTING AN ALTITUDE OF A VEHICLE DEPENDENT ON A GLOBAL POSITIONING SYSTEM

BACKGROUND OF THE INVENTION

The present invention relates to a navigation system mounted on vehicles such as automobiles, aircrafts and vessels, and more particularly to a system for detecting an altitude in the navigation system.

In a navigation system the present position of a vehicle is detected by such a position detecting means as a Global Positioning System (GPS). A receiver mounted on the vehicle receives radio waves transmitted from a plurality of GPS satellites to calculate the present position. A mark representing the position is indicated on a map shown on a display.

The GPS generally uses three or more GPS satellites to determine a two-dimensional position of the vehicle. That is the latitude and longitude are calculated based on position data of each satellite and a pseudo-distance between the vehicle and each satellite including a time offset caused by a time lag of the receiver.

In another example of the GPS, radio waves are transmitted from more than four satellites, thereby enabling to detect the three-dimensional position of the vehicle. Namely, the altitude of the vehicle is further calculated in addition to the latitude and the longitude.

However, due to circumferential conditions such as mountains and buildings, the radio waves from the satellites are often blocked, thereby rendering the three-dimensional positioning impossible. The conventional GPS accordingly calculates the altitude only when radio waves from more than four satellites are received. When radio waves from only three satellites are received, the two-dimensional position is calculated, setting the known altitude calculated at the last three-dimensional positioning as the current altitude.

However, the known altitude may deviate from the actual altitude, especially when the vehicle is driven in a mountainous region where the altitude largely fluctuates. The difference between the actual altitude and the set altitude increases with a lapse of time, thereby causing error in the calculated position of the vehicle.

Alternatively, an external memory, such as a CD-ROM storing a corresponding altitude obtained from a map or obtained by a manometer for detecting altitude dependent on ambient pressure of the vehicle, is provided on the vehicle for the GPS to determine the actual altitude. Upon the three-satellite detection, an altitude derived from the memory is used to calculate the position of the vehicle. The difference between the altitude calculated at the last four-satellite detection and the actual altitude may be so great that a mark indicating the position of the vehicle on the display abruptly jumps to another position.

Figure 12:
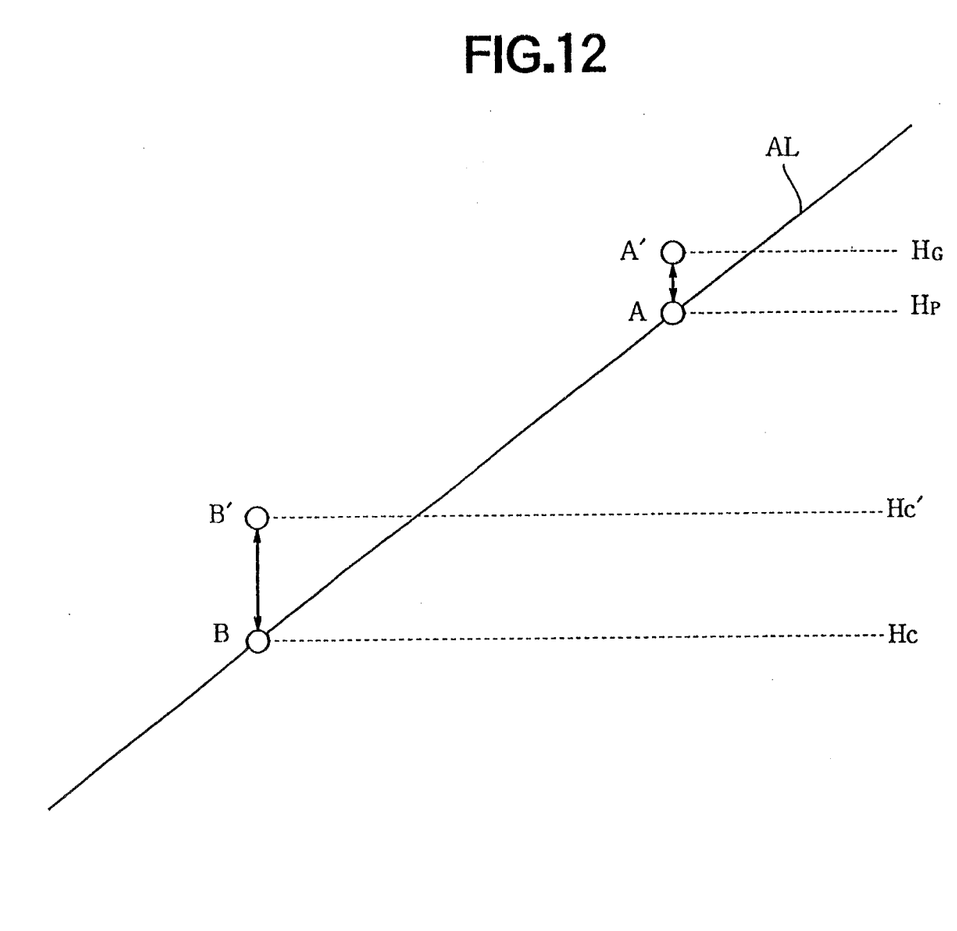
FIG. 12 is a flowchart showing the operation of a conventional positioning system.

FIG. 12 shows an example of altitude variation. The line AL shows an actual variation of altitude, a point A is a last detection position of the four-satellite detection, and a point B is a resumed detection position by the four-satellite detection. Therefore, the detection between points A and B is performed by the three-satellite detection. The altitude Hp at the point A is obtained by the memory, and the altitude $H_G$ at a point A' is obtained by the four-satellite detection. The altitude Hc at the point B is obtained by a memory, and the altitude Hc' at a point B' is obtained by the four-satellite detection. There is a large deviation from the actual altitude Hc.

SUMMARY OF THE INVENTION

An object of the present invention is to provide a positioning system where the mark on the display smoothly moves.

According to the present invention, there is provided a system for detecting an altitude of a vehicle dependent on a global positioning system (GPS) comprising, determining means for determining that the altitude can not be calculated from data applied from satellites and for producing a provisional calculation demand, calculating means responsive to the provisional calculation demand for calculating a provisional altitude by correcting a GPS altitude obtained by the GPS at a last time and a reference altitude obtained by an altitude determining means with a smoothing coefficient.

Other objects and features of this invention will become understood from the following description with reference to the accompanying drawings.

DETAILED DESCRIPTION OF THE PREFERRED EMBODIMENT

Figure 1:
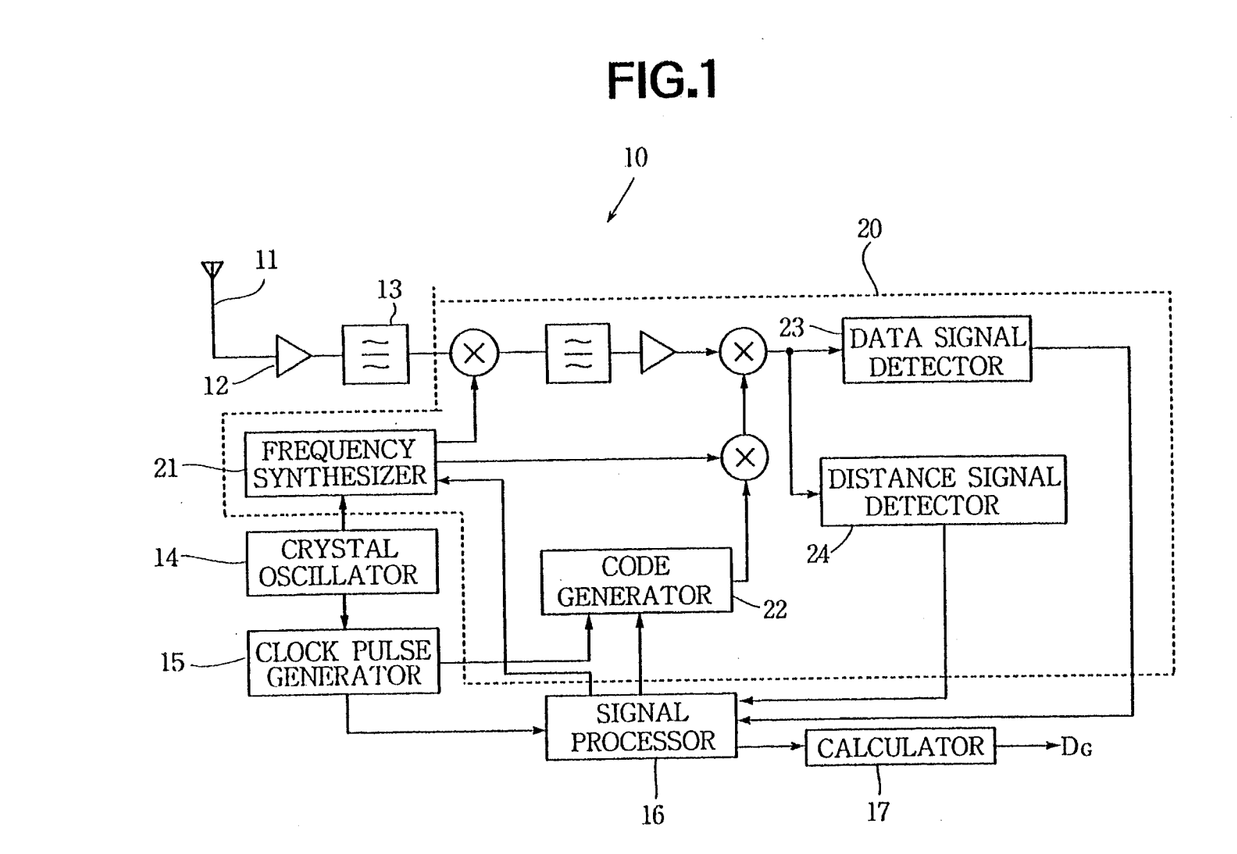
FIG. 1 is a block diagram of a GPS receiver to which the system of the present invention is applied.

Referring to FIG. 1, a GPS receiver 10 mounted on a vehicle has a GPS receiving section 20 to which radio waves from four satellites are applied through a GPS antenna 11, preamplifier 12 and a bandpass filter 13. The GPS receiver 10 has a crystal oscillator 14 for generating a reference frequency which is a timing control signal for the entire receiver 10. A clock 15 is further provided for generating clock pulses in accordance with the reference frequency fed from the crystal oscillator 14.

The GPS receiving section 20 has a frequency synthesizer 21 which is applied with the reference frequency from the crystal oscillator 14 to generate a signal having the same pattern as a carrier wave from the GPS satellites and a data signal representing data such as the positions of the GPS satellites and the states of the clocks therein. A code generator 22 is provided in the GPS receiving section 20 for generating a code signal in accordance with the clock pulses. The code signal has the same pattern as a distance signal applied from the GPS satellites.

The radio waves applied to the GPS receiving section 20 is multiplied by the synthesized signal from the frequency synthesizer 21 and by the code signal from the code generator 22 and fed to a data signal detector 23 and to a distance signal detector 24. The data signal detector 23 extracts the data signal representing the positions of the GPS satellites from the received signal. The distance signal detector 24 extracts the distance signal representing the distance between each GPS satellite and the vehicle in accordance with the code signal. The data signal and the distance signal are applied to a signal processor 16.

The signal processor 16 is applied with the clock pulses generated by the clock pulse generator 15 so as to process the fed signals at the timing which coincides with the clock pulses. The processed signals are applied to a calculator 17 to produce GPS data $D_G$, that is data concerning the position of the vehicle. The calculator 17 is provided with means for correcting the calculated altitude, the operation of which is described in detail hereinafter.

Figure 2:
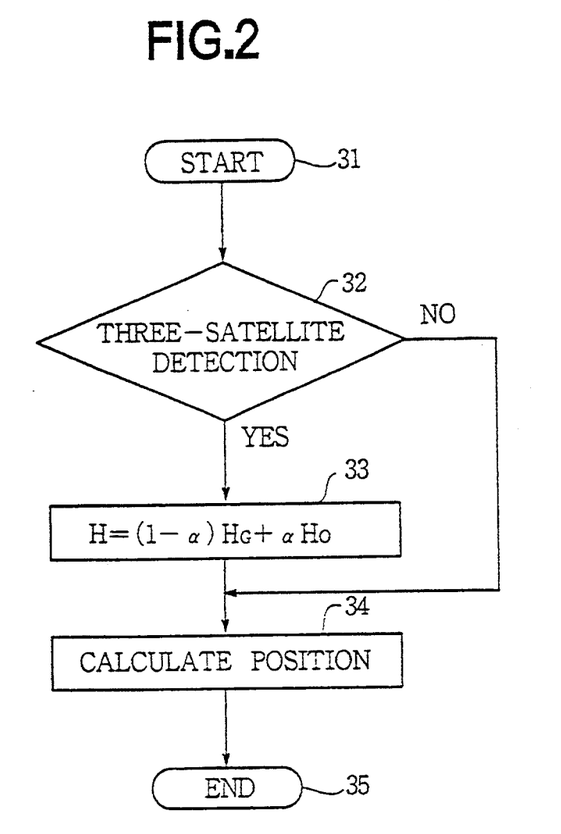
FIG. 2 is a flowchart describing the operation of a correcting system of the present invention.

Referring to FIG. 2, the program for determining the position of the vehicle starts at a step 31. When the GPS receiver 10 cannot receive waves from one of the four satellites, the signal processor 16 determines at a step 32 that a three-satellite detection instead of a four-satellite detection is to be carried out. Thereafter at a step 33, data for an altitude H as a factor for determining the position of the vehicle is provided at the calculator 17 in accordance with, $$H = (1-\alpha)H_G = \alpha H_O \quad (1)$$

where $H_G$ is an altitude which was obtained at the last four-satellite detection, $H_O$ is a reference altitude obtained by such devices as a manometer and $\alpha$ ($0 < \alpha 1$) is a predetermined smoothing coefficient.

At a step 34, the position is calculated in accordance with the calculated altitude H and the program ends at a step 35. Thus, the altitude smoothly changes.

When the four-satellite detection is continued, the program goes directly from the step 32 to the step 34. The program is repeated at a regular interval.

Figure 3:
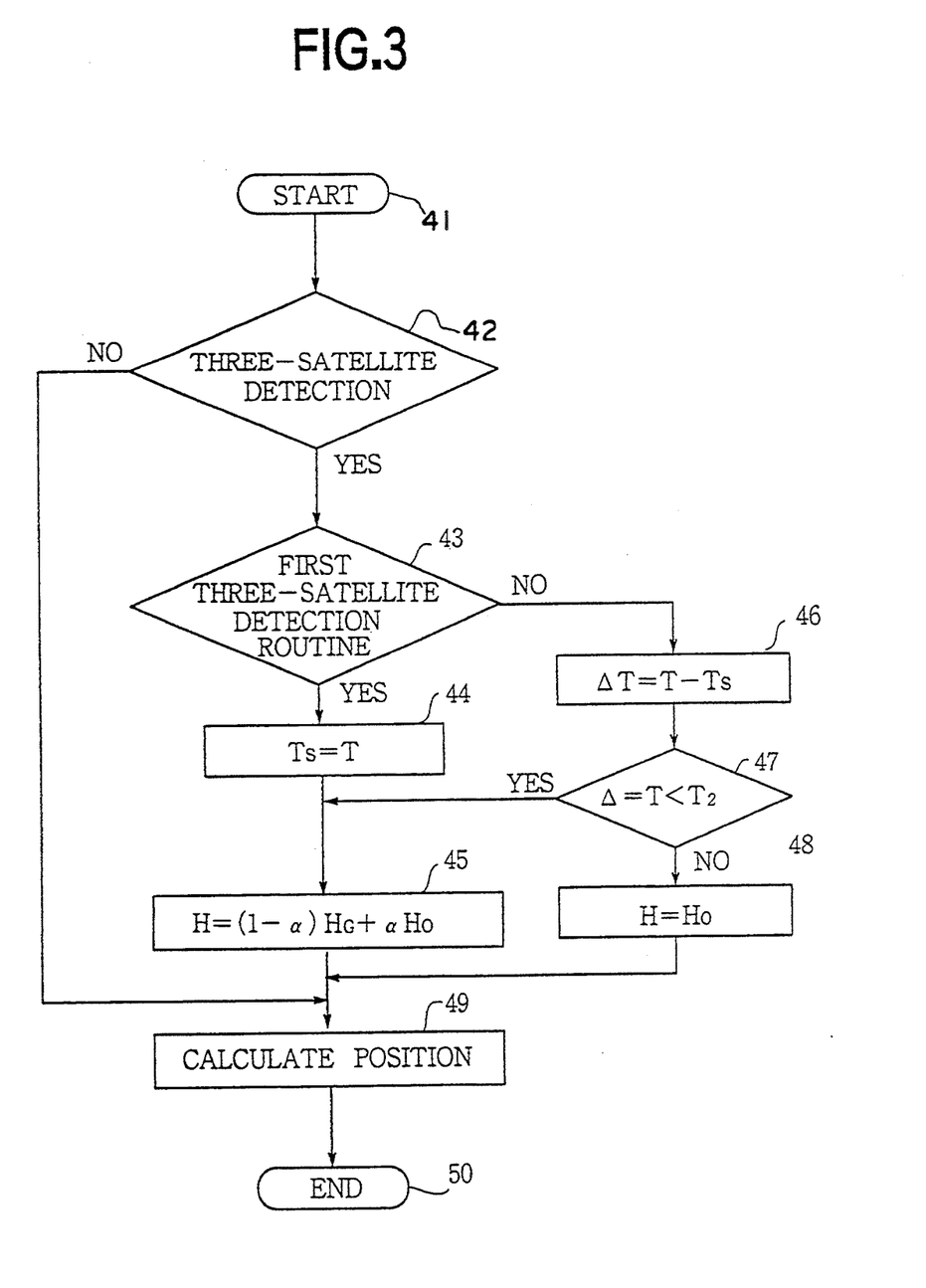
FIG. 3 is a flowchart describing the operation of the correcting system of a second embodiment of the present invention.

Referring to FIG. 3, the operation in accordance with the second embodiment starts at a step 41 and at a step 42, it is determined whether the three-satellite detection is carried out. When the answer is YES, it is further determined at a step 43 whether the present routine is the first routine after the change from four-satellite detection to the three-satellite detection. If the signal processor 16 determines that it is the first routine since the change, the present time T is set as a reference time Ts (Ts=T). Thereafter, the program proceeds to a step 45 wherein the altitude H is calculated in accordance with the equation (1) described in the first embodiment. Accordingly, the position of the vehicle is calculated at a step 49 and the routine ends at a step 50.

In the next routine, that is, in the second routine after the change of detecting system, the program goes from the step 43 to a step 46 wherein a period $\Delta T$ lapsed since the start of the three-satellite detection is calculated in accordance with, $$\Delta T = T - T2$$

At a step 47, the period $\Delta T$ is compared with a period T2 which is an empirically predetermined value appropriate for correcting the altitude H. When the period $\Delta T$ is smaller than the period T2, the program goes to the step 45 where the altitude is calculated in accordance with the equation (1) and the position is further calculated at a step 49.

When it is determined at the step 47 that the period $\Delta T$ exceeds the reference period T2, the altitude H is set at the actual altitude $H_O$.

During the four-satellite detection, the program jumps from the step 42 to the step 49 without correcting the altitude and ends at a step 50.

Thus, in the second embodiment, since the deviation of the altitude $H_G$ from the actual altitude $H_O$ increases with the lapse of time, the altitude H is corrected only for a predetermined period of time.

Figure 4:
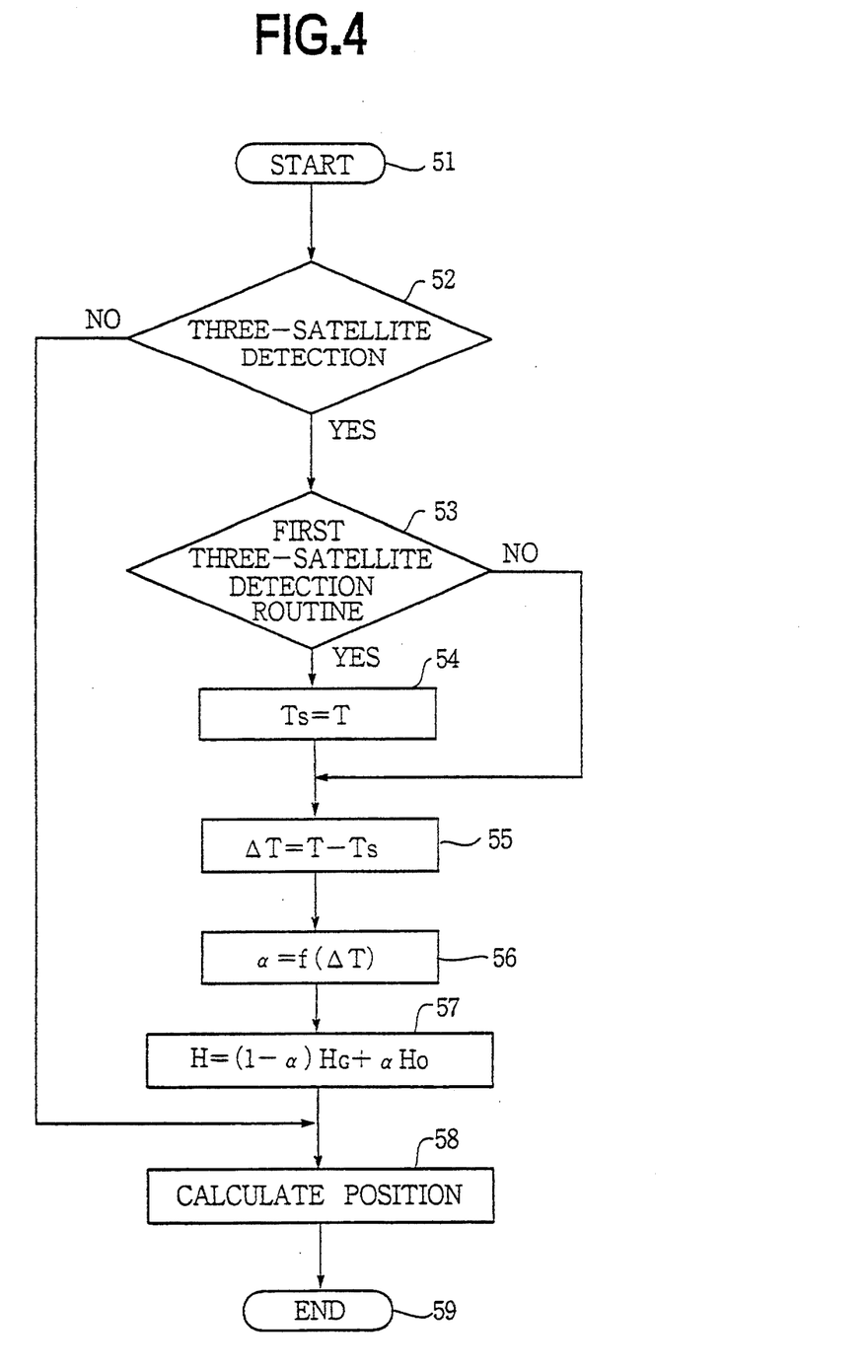
FIG. 4 is a flowchart describing the operation of the correcting system of a third embodiment.

The third embodiment of the present invention is also adapted to prevent the altitude H from excessively deviating from the actual altitude $H_O$. As shown in FIG. 4, steps 51 to 54 are executed in the same manner as the steps 41 to 44 in FIG. 3. Namely, in the first routine since the change from the four-satellite detection to the three-satellite detection occurred, the present time T is set as the reference time Ts. In the second routine, the program goes from the step 53 to a step 55 where the lapsed period is calculated. Thereafter, at a step 56, the smoothing coefficient $\alpha$ is set as a function of the period $\Delta T$ ($\alpha = f(\Delta T)$).

For example, the smoothing coefficient $\alpha$ is calculated as, $$\alpha = \Delta T/50$$

The smoothing coefficient is set between 0 and 1 ($0 \leq \alpha \leq 1$) and should not exceed 1 despite the calculation of the above equation.

The altitude H is hence calculated in accordance with the equation (1) at a step 57. Thereafter, the position is calculated at a step 58 and the program ends at a step 59.

In the present embodiment, the smoothing coefficient increases with the lapse of time. Hence the calculated altitude gradually approximates the actual altitude $H_O$ until, when the smoothing coefficient reaches 1, the altitude equals $H_O$.

Figure 5:
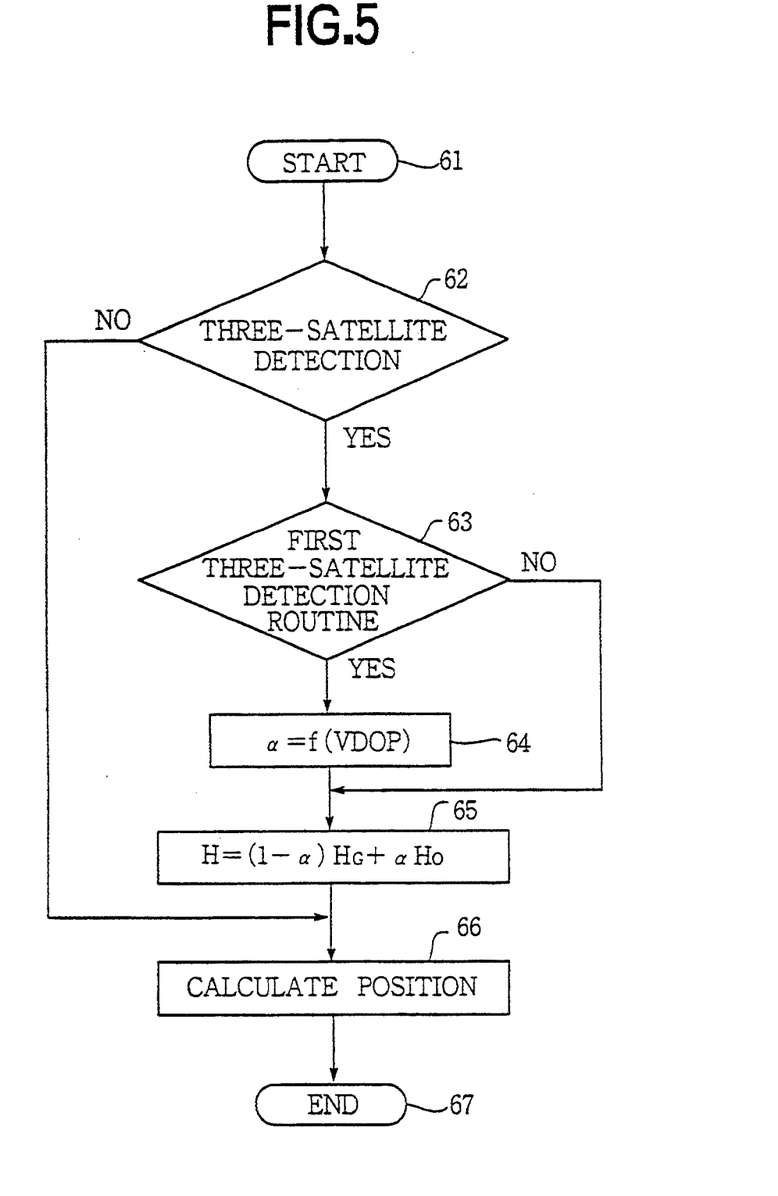
FIG. 5 is a flowchart describing the operation of the correcting system of a fourth embodiment.

In the fourth embodiment of the present invention which is described in FIG. 5, a vertical dilution of precision (VDOP) is detected in order to obtain the smoothing coefficient $\alpha$. More particularly, when the precision of the calculated altitude H is high so that the value of the VDOP is small, the smoothing coefficient $\alpha$ is set at a small value.

In the flowchart of FIG. 5, steps 61 to 63 are identical to the steps 51 to 53 in FIG. 4. In the first routine of the three-satellite detection, the program goes from the step 63 to a step 64 where the smoothing coefficient $\alpha$ is set as a function of VDOP ($\alpha = f(VDOP)$, $0 \leq \alpha \leq 1$).

In an example of the embodiment, the coefficient $\alpha$ is set in accordance with the VDOP as follows.

When $0 \leq VDOP < 5$, $\alpha = 0.1$
When $5 \leq VDOP < 10$, $\alpha = 0.2$
When $10 \leq VDOP < 15$, $\alpha = 0.3$
When $15 \leq VDIP < 20$, $\alpha = 0.4$
When $20 \leq VDOP$, $\alpha = 0.5$ The altitude H is calculated at a step 65 in accordance with the equation (1) and with the determined smoothing coefficient $\alpha$.

Namely, when the value of VDOP is small, a small smoothing coefficient α is set so that the calculated altitude H is close to the altitude $H_G$. As the value of VDOP increases, the smoothing coefficient also increases, thereby rendering the altitude H to approximate the actual altitude $H_O$. Thereafter, the position of the vehicle is calculated at a step 66 and the routine ends at a step 67.

In the second and the following routines, the program goes from the step 63 to the step 65 without obtaining the smoothing coefficient α. The coefficient α is thus constant throughout the three-satellite detection.

Figure 6:
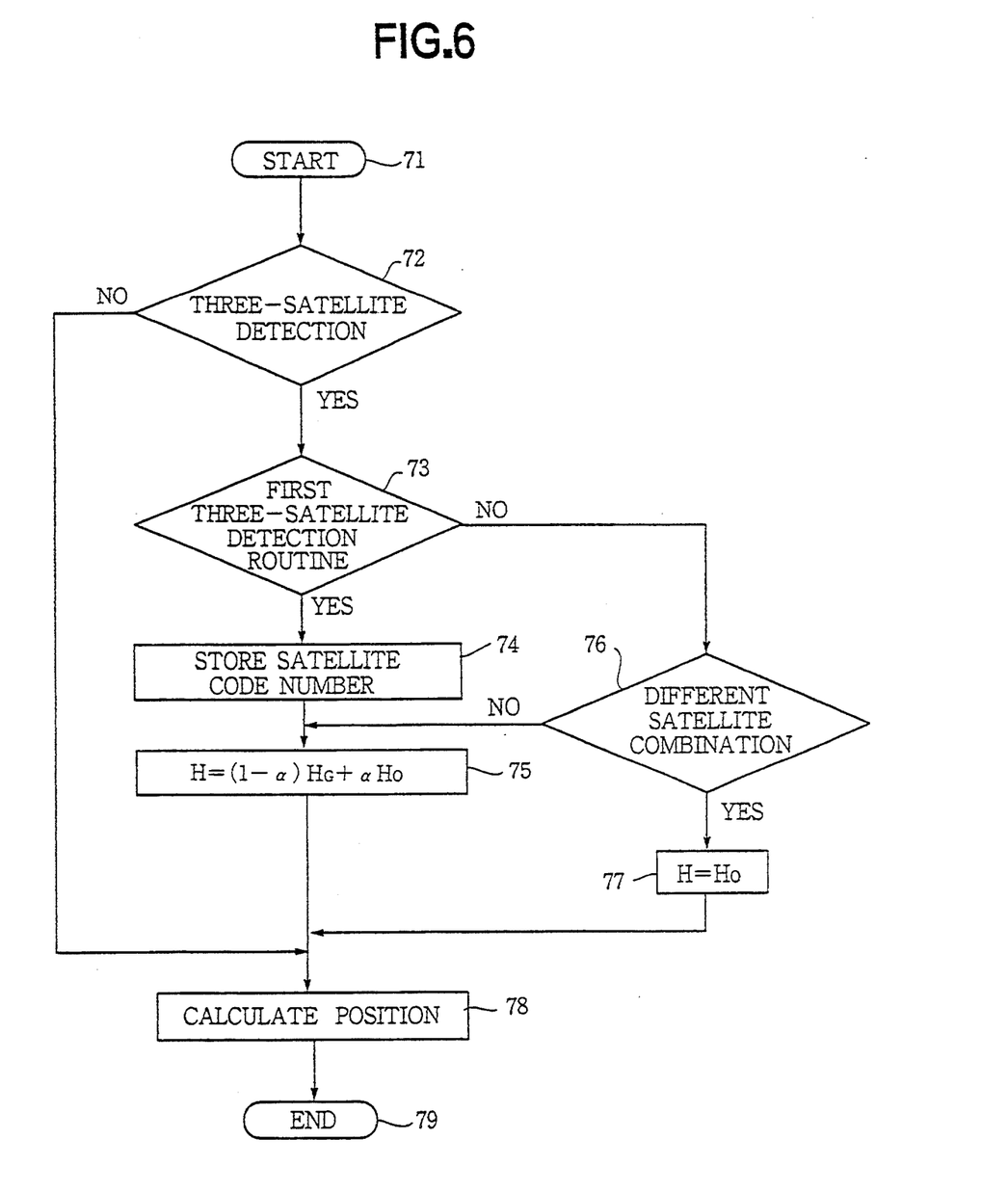
FIG. 6 is a flowchart describing the operation of the correcting system of a fifth embodiment.

Referring to FIG. 6 showing the operation of the fifth embodiment of the present invention, the steps 71 to 73 are identical to steps 61 to 63 of FIG. 5. During the first routine of the three-satellite detection, the program proceeds to a step 74 where code numbers of the satellites are stored in a memory. At a step 75, the altitude H is calculated in the same manner as in the first and second embodiments, and the position of the vehicle is accordingly calculated at a step 78. The routine thus ends at a step 79.

In the second and the following routines, the program goes from the step 73 to a step 76 where the code numbers of three-satellites transmitting waves to the GPS receiver 10 are compared with the code numbers stored in the memory at the step 74. If the numbers are the same, the program proceeds to the step 75 to calculate the altitude H.

When it is determined at the step 76 that the code numbers differ, it means that the combination of the functioning satellite has changed. In such a case, there may be an error in the altitude $H_G$ so that it is undesirable to use the altitude $H_G$ in calculating the altitude H and hence the position of the vehicle. Accordingly, the actual altitude $H_O$ itself is determined as the altitude H without any correction. The position of the vehicle is calculated at the step 78 in accordance with the actual altitude $H_O$.

Figure 7:
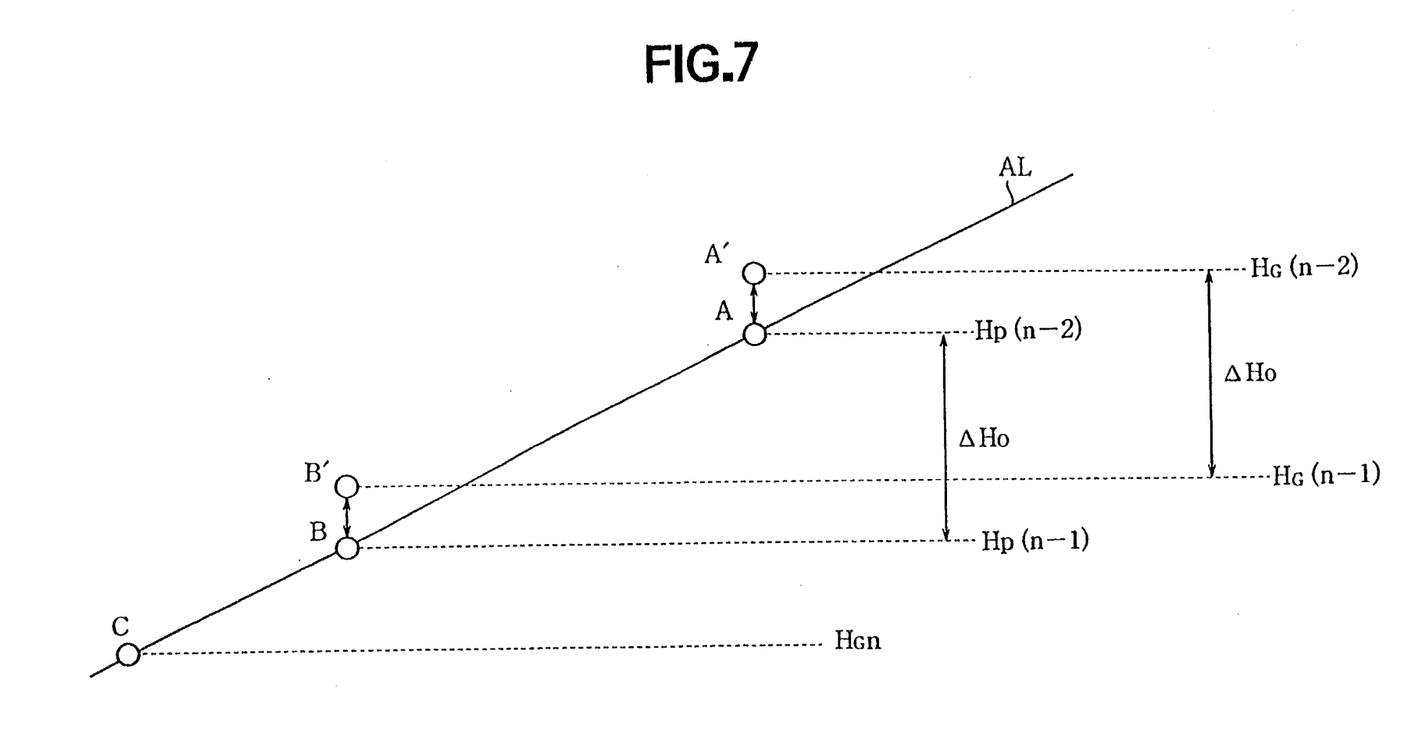
FIG. 7 is a diagram for explaining a sixth embodiment.

Referring to FIG. 7, a point C is a present position the altitude $H_{Gn}$ of which is to be calculated, a point B shows a last position the reference altitude $H_P(n-1)$ of which has been obtained from a memory at the last time, and a point A shows a point before last the reference altitude $H_P(n-2)$ has been obtained from the memory at the time before last.

On the other hand, B' is a point representing a GPS altitude $H_G(n-1)$ detected by the last four-satellite detection, and A' is a point representing a GPS altitude $H_G(n-2)$ at the time before last.

The altitude difference $\Delta H_O$ between reference altitudes $H_P(n-1)$ and $H_P(n-2)$ points B and A is $$\Delta H_O = H_P(n-1) - H_P(n-2)$$

The altitude difference between GPS altitudes $H_G(n-1)$ and $H_G(n-2)$ is equal to the difference $\Delta H_C$.

Therefore, the altitude $H_{Gn}$ at the point C can be obtained as follows.

$$H_{Gn} = H_G(n-1) + \Delta H_0$$

Figure 8:
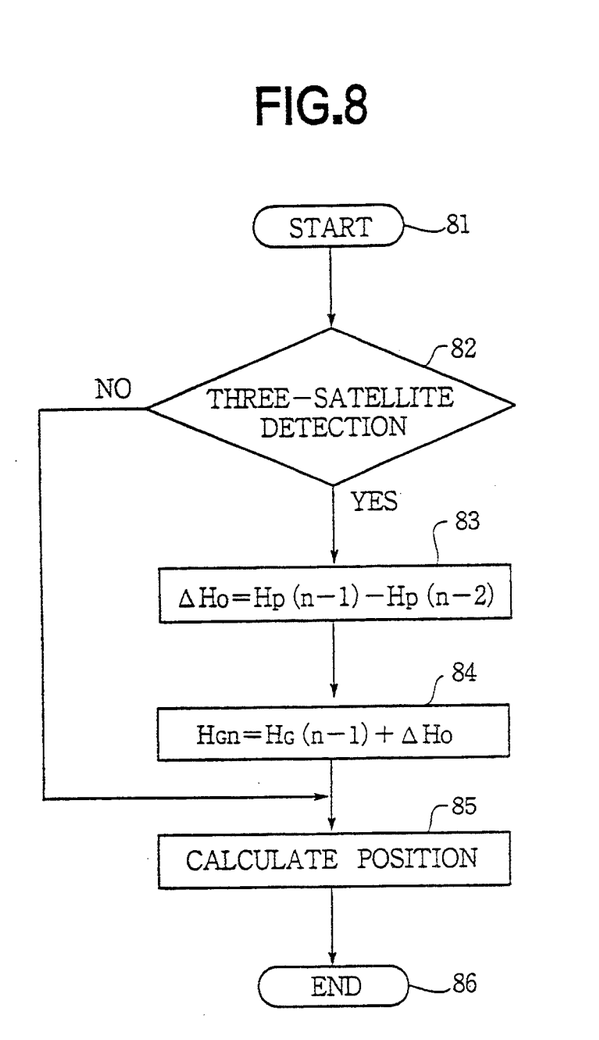
FIG. 8 is a flowchart showing the operation of the sixth embodiment.

Explaining the operation with reference to FIG. 8, when the three-satellite detection is performed (step 82), $\Delta H_O$ is calculated at a step 83. The height $H_{Gn}$ is calculated at a step 84, and the position is calculated at a step 85.

Figure 9:
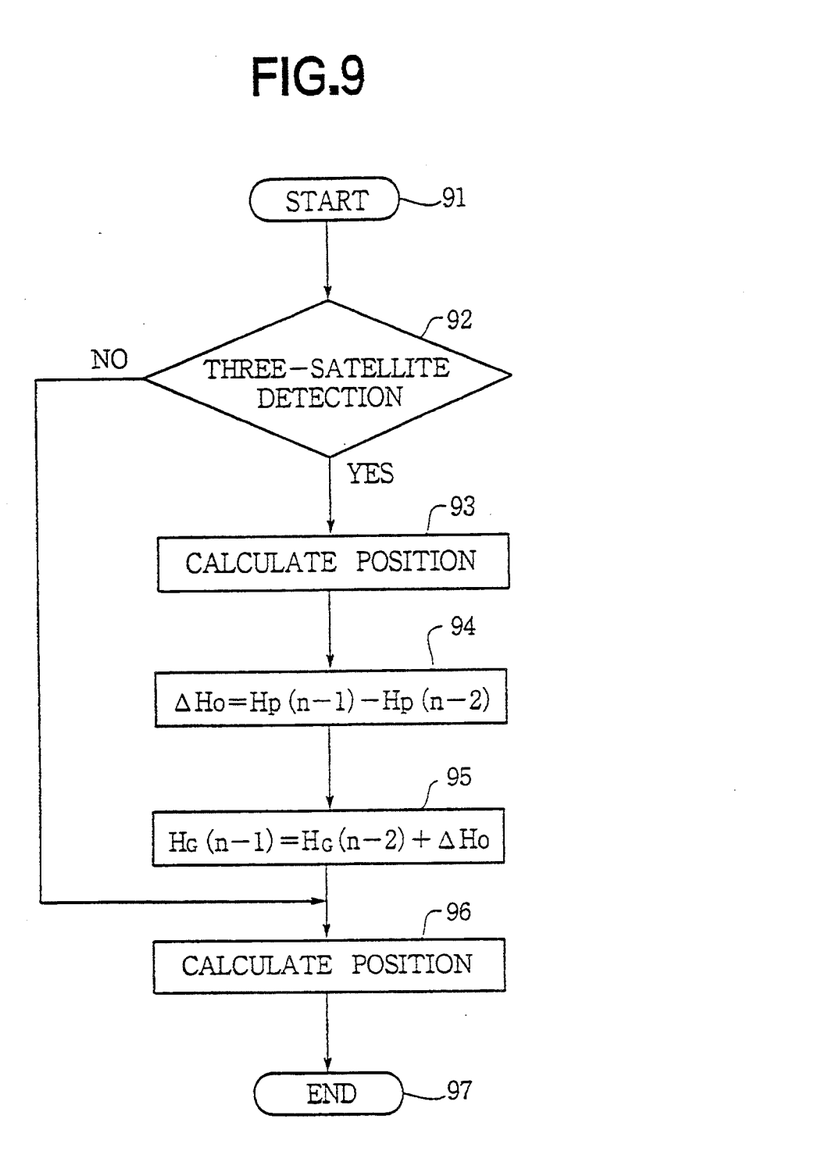
FIG. 9 is a flowchart showing the operation of a seventh embodiment.

Referring to FIG. 9 showing the seventh embodiment, the embodiment is to obtain the height at the point B of FIG. 7. At a step 93, the position of the point A is calculated. The height $H_G(n-1)$ at the point B is calculated as a step 95.

Figure 10:
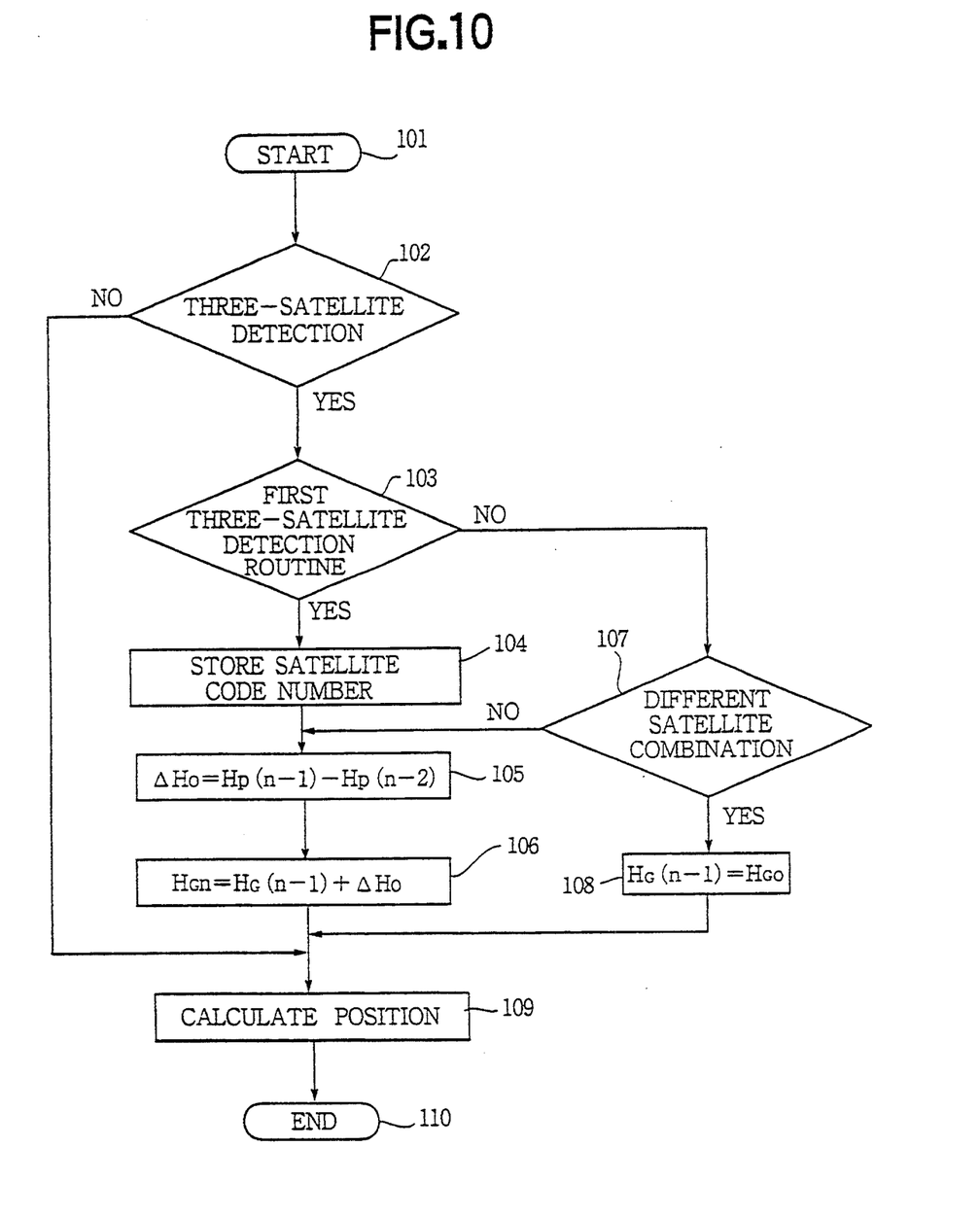
FIG. 10 is a flowchart showing the operation of an eighth embodiment.

The embodiment of FIG. 10 is the combination of the sixth embodiment of FIG. 8 and the fifth embodiment of FIG. 6.

Figure 11:
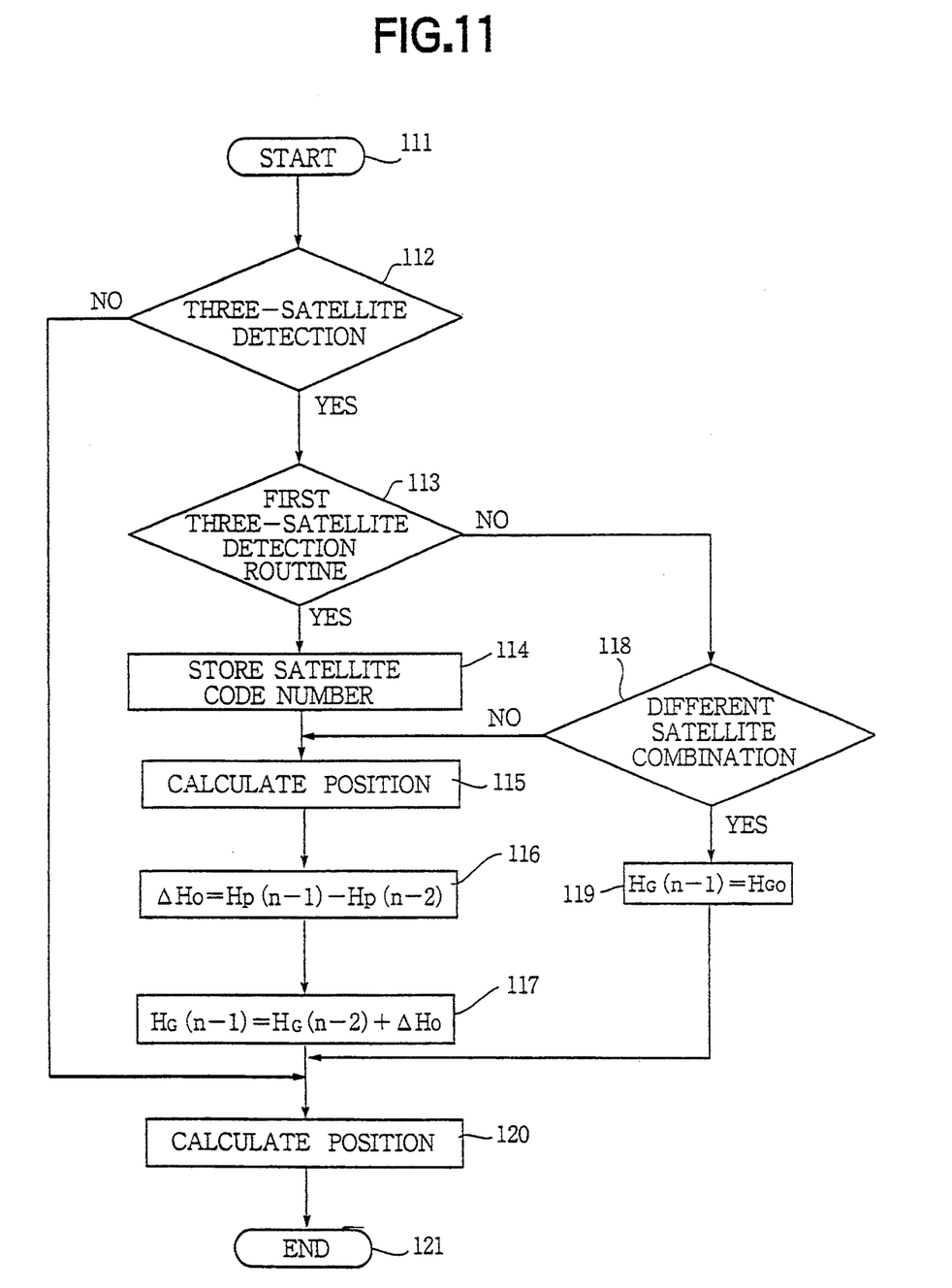
FIG. 11 is a flowchart showing the operation of a ninth embodiment.

The embodiment of FIG. 11 is the combination of the embodiment of FIG. 9 and the embodiment of FIG. 6.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for detecting an altitude of a vehicle dependent on a global positioning system (GPS) comprising:
   determining means for determining that the altitude can not be calculated from data applied from satellites and for producing a provisional calculation demand;
   calculating means responsive to the provisional calculation demand for calculating a provisional altitude by correcting a GPS altitude obtained by the GPS at a last time and a reference altitude obtained by an altitude determining means with a smoothing coefficient.

2. The system according to claim 1 wherein:
   said altitude determining means is a memory storing reference altitude data.

3. The system according to claim 1 wherein:
   said calculation is performed with a following equation:

$$H = (1-\alpha) H_G + \alpha H_O$$

where $H_G$ is an altitude obtained by the GPS, $H_O$ is a reference altitude obtained by another device, and α $(0 < \alpha < 1)$ is a predetermined smoothing coefficient.

4. A system for detecting an altitude of a vehicle dependent on a global positioning system (GPS) comprising:
   determining means for determining that the altitude can not be calculated from data applied from satellites and for producing a provisional calculation demand; and
   calculating means responsive to the provisional calculation demand for calculating a provisional altitude by adding a difference between a first reference altitude obtained at a last time and a second reference altitude obtained at a time before the last time to the first reference altitude.

* * * * *